(12) United States Patent
Li et al.

(10) Patent No.: US 12,197,102 B2
(45) Date of Patent: Jan. 14, 2025

(54) LIQUID CRYSTAL LENS COMPONENT AND DRIVING METHOD THEREFOR, AND DISPLAY DEVICE

(71) Applicant: BOE Technology Group Co., Ltd., Beijing (CN)

(72) Inventors: Zhongxiao Li, Beijing (CN); Weili Zhao, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/579,363

(22) PCT Filed: Nov. 29, 2021

(86) PCT No.: PCT/CN2021/133924
§ 371 (c)(1),
(2) Date: Jan. 14, 2024

(87) PCT Pub. No.: WO2023/092544
PCT Pub. Date: Jun. 1, 2023

(65) Prior Publication Data
US 2024/0337892 A1 Oct. 10, 2024

(51) Int. Cl.
*G02F 1/29* (2006.01)
(52) U.S. Cl.
CPC .................................. *G02F 1/294* (2021.01)
(58) Field of Classification Search
None
See application file for complete search history.

(56) References Cited

U.S. PATENT DOCUMENTS

2012/0320009 A1 12/2012 Liu
2013/0141414 A1 6/2013 Park
(Continued)

FOREIGN PATENT DOCUMENTS

CN 102749775 A 10/2012
CN 102968968 A 3/2013
(Continued)

OTHER PUBLICATIONS

PCT/CN2021/133924 international search report dated Aug. 26, 2022.

*Primary Examiner* — Ryan Crockett
(74) *Attorney, Agent, or Firm* — IPro, PLLC

(57) ABSTRACT

Disclosed are a liquid crystal lens component and a driving method therefor, and a display device. The method includes: applying a common voltage signal to a second electrode; and applying a driving signal to a first electrode, which includes: in two image frames that are adjacent to each other, applying driving signals with opposite polarities to the first electrode in one liquid crystal lens unit; in one image frame, applying driving signals with the same polarity to the plurality of first sub-electrodes in a same first electrode group, applying driving signals with the same polarity to the plurality of first sub-electrodes in a same second electrode group, applying positive voltage driving signals to partial first sub-electrodes of all first sub-electrodes in the liquid crystal lens component, and applying negative voltage driving signal to the remaining first sub-electrodes of all the first sub-electrodes in the liquid crystal lens component.

20 Claims, 14 Drawing Sheets

(56) References Cited

U.S. PATENT DOCUMENTS

| | | | |
|---|---|---|---|
| 2013/0250223 A1* | 9/2013 | Takagi | G02F 1/134309 |
| | | | 349/138 |
| 2014/0104545 A1* | 4/2014 | Miyazawa | G02B 30/27 |
| | | | 349/96 |
| 2014/0375913 A1 | 12/2014 | Jen et al. | |
| 2015/0312562 A1* | 10/2015 | Kim | G09G 3/20 |
| | | | 348/59 |
| 2016/0011431 A1 | 1/2016 | Kashiwagi et al. | |
| 2017/0045787 A1 | 2/2017 | Kita et al. | |
| 2018/0188630 A1 | 7/2018 | Zhao et al. | |
| 2018/0211617 A1* | 7/2018 | Li | G09G 3/3614 |
| 2020/0201130 A1 | 6/2020 | Qiao et al. | |
| 2022/0208041 A1* | 6/2022 | Ikeda | G09G 3/3648 |

FOREIGN PATENT DOCUMENTS

| | | |
|---|---|---|
| CN | 103135272 A | 6/2013 |
| CN | 104252082 A | 12/2014 |
| CN | 105045001 A | 11/2015 |
| CN | 105259725 A | 1/2016 |
| CN | 105607380 A | 5/2016 |
| CN | 106462020 A | 2/2017 |
| CN | 107633823 A | 1/2018 |
| CN | 112967698 A | 6/2021 |

\* cited by examiner

Applying a common voltage signal to the second electrode and applying a driving signal to the first electrode to control liquid crystals in the liquid crystal layer to be deflected to form a liquid crystal lens; where the applying a driving signal to the first electrode, includes: in two image frames that are adjacent to each other, applying driving signals with opposite polarities to the first electrode in one liquid crystal lens unit; in one image frame, applying driving signals with the same polarity to the plurality of first sub-electrodes in a same first electrode group, applying driving signals with the same polarity to the plurality of first sub-electrodes in a same second electrode group, applying positive voltage driving signals to partial first sub-electrodes of all first sub-electrodes in the liquid crystal lens module, and applying negative voltage driving signal to the remaining first sub-electrodes of all the first sub-electrodes in the liquid crystal lens module

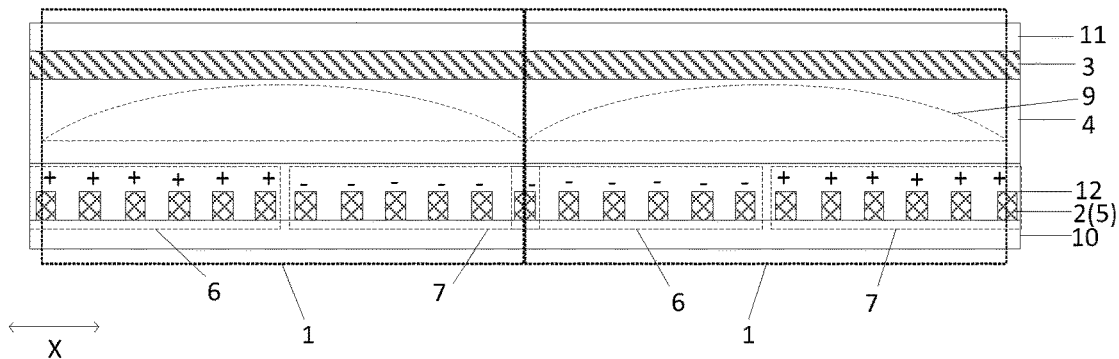

FIG. 5

LIQUID CRYSTAL LENS COMPONENT AND DRIVING METHOD THEREFOR, AND DISPLAY DEVICE

CROSS REFERENCE TO RELATED APPLICATIONS

The present disclosure is a National Stage of International Application No. PCT/CN2021/133924, filed Nov. 29, 2021.

TECHNICAL FIELD

The present disclosure relates to the field of display technology, in particular to a liquid crystal lens component, a driving method therefor, and a display device.

BACKGROUND 3D display technology can provide stereoscopic display images for human eyes. Liquid crystal lens has excellent performance, can be electrically focused, and is widely used in focusing equipment and human eye magnification equipment, especially plays a prominent role in 3D display. The application of liquid crystal lens can get rid of the shackles of 3D glasses on human eyes, achieve naked-eye 3D display, and can realize arbitrary switching between 2D/3D display modes, which has a huge application prospect in the future.

SUMMARY

An embodiment of the present disclosure provides a method for driving a liquid crystal lens component. The liquid crystal lens component includes: a plurality of liquid crystal lens units arranged in an array;
each of the plurality of liquid crystal lens units includes: a first electrode and a second electrode disposed oppositely, and a liquid crystal layer between the first electrode and the second electrode;
the first electrode includes: a plurality of first sub-electrodes arranged along a first direction and extending along a second direction, where the first direction intersects the second direction;
the plurality of first sub-electrodes are divided into: a first electrode group and a second electrode group respectively on both sides of a center of the liquid crystal lens unit;
where the method includes:
applying a common voltage signal to the second electrode, and applying a driving signal to the first electrode to control liquid crystals in the liquid crystal layer to be deflected to form a liquid crystal lens; where
where the applying the driving signal to the first electrode, includes:
in two image frames that are adjacent to each other, applying driving signals with opposite polarities to the first electrode in one liquid crystal lens unit;
in one image frame, applying driving signals with the same polarity to the plurality of first sub-electrodes in a same first electrode group, applying driving signals with the same polarity to the plurality of first sub-electrodes in a same second electrode group, applying positive voltage driving signals to partial first sub-electrodes of all first sub-electrodes in the liquid crystal lens component, and applying negative voltage driving signal to the remaining first sub-electrodes of all the first sub-electrodes in the liquid crystal lens component.

In some embodiments, the applying the driving signal to the first electrode, further including:
in one image frame, applying driving signals with opposite polarities to the first electrode group and the second electrode group in each of the plurality of liquid crystal lens units.

In some embodiments, in the first direction, two liquid crystal lens units that are adjacent to each other share first sub-electrodes at a position at which the two liquid crystal lens units are adjacent; and the applying the driving signal to the first electrode further includes: in one image frame and in the first direction, applying driving signals with the same polarity to a first electrode group and a second electrode group that are in different liquid crystal lens units and adjacent to each other.

In some embodiments, the plurality of liquid crystal lens units are divided into a plurality of liquid crystal lens unit columns extending along the second direction and arranged along the first direction; and the applying the driving signal to the first electrode further includes:
in one image frame, applying driving signals with the same polarity to first electrode groups in a same liquid crystal lens unit column, and applying driving signals with the same polarity to second electrode groups in a same liquid crystal lens unit column.

In some embodiments, first electrodes in the plurality of liquid crystal lens units are independent of each other, and the plurality of liquid crystal lens units are divided into a plurality of liquid crystal lens unit columns extending along the second direction and arranged along the first direction; and the applying the driving signal to the first electrode further includes:
in one image frame, applying driving signals with opposite polarities to first electrode groups that are adjacent to each other in a same liquid crystal lens unit column; and applying driving signals with opposite polarities to second electrode groups that are adjacent to each other in a same liquid crystal lens unit column.

In some embodiments, first electrodes in the plurality of liquid crystal lens units are independent of each other, and the plurality of liquid crystal lens units are divided into a plurality of liquid crystal lens unit columns extending along the second direction and arranged along the first direction; the plurality of liquid crystal lens units are further divided into a plurality of liquid crystal lens unit groups arranged along the second direction, and each of the plurality of liquid crystal lens unit groups includes a plurality of liquid crystal lens unit rows extending along the first direction; and the applying the driving signal to the first electrode further includes:
in one image frame, applying driving signals with the same polarity to first electrode groups in a same liquid crystal lens unit group in one liquid crystal lens unit column, applying driving signals with the same polarity to second electrode groups in a same liquid crystal lens unit group in one liquid crystal lens unit column; applying driving signals with the opposite polarities to first electrode groups in liquid crystal lens unit groups that are adjacent to each other in one liquid crystal lens unit column, and applying driving signals with the opposite polarities to second electrode groups in liquid crystal lens unit groups that are adjacent to each other in one liquid crystal lens unit column.

In some embodiments, first electrodes in the plurality of liquid crystal lens units are independent of each other, and the plurality of liquid crystal lens units are divided into a plurality of liquid crystal lens unit rows extending along the first direction and arranged along the second direction; and the applying the driving signal to the first electrode further includes:

in one image frame, applying driving signals with the same polarity to first sub-electrodes in a same liquid crystal lens unit row, and applying driving signals with opposite polarities to first sub-electrodes in liquid crystal lens unit rows that are adjacent to each other.

In some embodiments, first electrodes in the plurality of liquid crystal lens units are independent of each other, and the plurality of liquid crystal lens units are divided into a plurality of liquid crystal lens unit groups arranged along the second direction, and each of the plurality of liquid crystal lens unit groups includes a plurality of liquid crystal lens unit rows extending along the first direction; and where the applying the driving signal to the first electrode further includes:

in one image frame, applying driving signals with the same polarity to first sub-electrodes in a same liquid crystal lens unit group, and applying driving signal with opposite polarities to first sub-electrodes in two liquid crystal lens unit groups that are adjacent to each other.

In some embodiments, first electrodes in the plurality of liquid crystal lens units are independent of each other, and the applying the driving signal to the first electrode further includes:

in one image frame, applying driving signals with the same polarity to first sub-electrodes in a same liquid crystal lens unit, and applying driving signals with opposite polarities to first sub-electrodes in liquid crystal lens units that are adjacent to each other.

In some embodiments, the first electrode further includes: a third electrode group between the first electrode group and the second electrode group; and the applying the driving signal to the first electrode further includes:

applying the common voltage signal to the third electrode group.

In some embodiments, the third electrode group includes at least one second sub-electrode extending along the second direction; an orthographic projection of the center of the liquid crystal lens unit on the liquid crystal layer is located in an orthographic projection of one of the at least one second sub-electrode in the third electrode group on the liquid crystal layer; and the applying the common voltage signal to the third electrode group includes:

applying the common voltage signal to the at least one second sub-electrode.

In some embodiments, the common voltage signal is a zero voltage signal.

In some embodiments, the first electrode group and the second electrode group comprise a same quantity of first sub-electrodes; from the center of the liquid crystal lens unit to two edges of the liquid crystal lens unit, absolute values of driving voltages applied to the first sub-electrodes are distributed with a preset gradient.

A liquid crystal lens component provided by an embodiment of the present disclosure includes: a plurality of liquid crystal lens units arranged in an array;

where each of the plurality of liquid crystal lens units includes: a first electrode and a second electrode disposed oppositely, a liquid crystal layer between the first electrode and the second electrode;

the first electrode includes: a plurality of first sub-electrodes arranged along a first direction and extending along a second direction, where the first direction intersects the second direction; and the plurality of first sub-electrodes are divided into: a first electrode group and a second electrode group respectively on both sides of a center of the liquid crystal lens unit;

where the liquid crystal lens component is driven by the method provided by the embodiments of the present disclosure.

A display device provided by an embodiment of the present disclosure includes: a display panel, and a liquid crystal lens component provided by the embodiments of the present disclosure on a display side of the display panel.

BRIEF DESCRIPTION OF FIGURES

In order to more clearly illustrate the technical solutions in the embodiments of the present disclosure, the drawings that need to be used in the description of embodiments will be briefly introduced below. Obviously, the drawings in the following description are only some embodiments of the present disclosure. For those of ordinary skill in the art can also obtain other drawings based on these drawings without making creative efforts.

FIG. 4 is a schematic diagram of a method for driving a liquid crystal lens component provided by embodiments of the present disclosure.

FIG. 5 is a schematic diagram of another method for driving a liquid crystal lens component provided by embodiments of the present disclosure.

DETAILED DESCRIPTION

Figure 1:
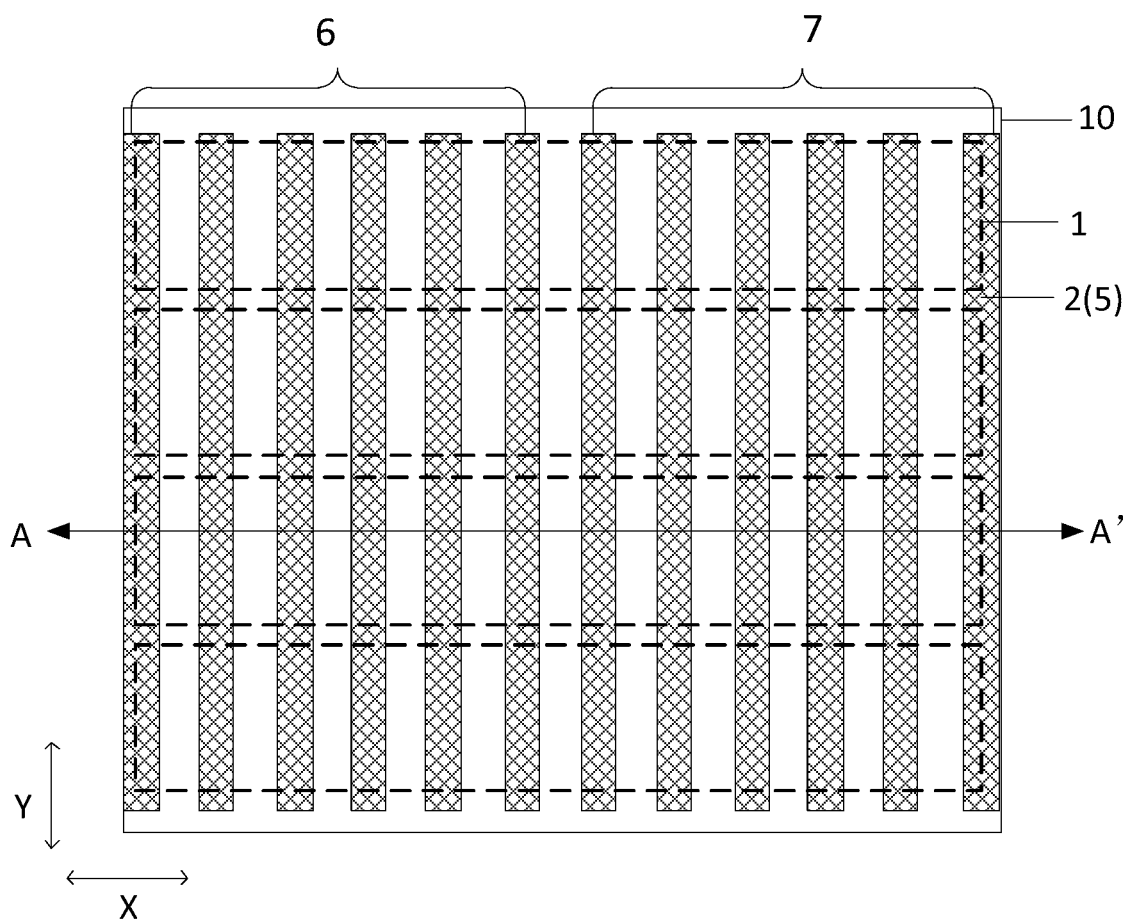
FIG. 1 is a schematic structural diagram of a liquid crystal lens component provided by embodiments of the present disclosure.

In order to make the purpose, technical solutions and advantages of embodiments of the present disclosure clearer, the technical solutions of embodiments of the present disclosure will be clearly and completely described below in conjunction with the accompanying drawings of embodiments of the present disclosure. Apparently, the described embodiments are some of embodiments of the present disclosure, not all of them. And in the case of no conflict, embodiments in the present disclosure and features in the embodiments can be combined with each other. Based on the described embodiments of the present disclosure, all other embodiments obtained by persons of ordinary skill in the art without creative effort fall within the claimed scope of the present disclosure.

Unless otherwise defined, the technical terms or scientific terms used in the present disclosure shall have the usual meanings understood by those skilled in the art to which the present disclosure belongs. "First", "second" and similar words used in the present disclosure do not indicate any order, quantity or importance, but are only used to distinguish different components. "Comprising" or "containing" and similar words mean that the elements or items appearing before the word include the elements or items and their equivalents listed after the word and their equivalents, without excluding other elements or items. Words such as "connected" or "coupled" are not limited to physical or mechanical connections, but may include electrical connections, whether direct or indirect.

It should be noted that the size and shape of each figure in the drawings do not reflect the true scale, but are only intended to illustrate the present disclosure. And the same or similar reference numerals represent the same or similar elements or elements having the same or similar functions throughout.

The design for the liquid crystal lens component in the related art needs to drive, through the pixel electrode and the common electrode, the liquid crystal to be deflected to form a lens morphology. In order to avoid the liquid crystal polarization phenomenon, the positive and negative voltages of the driving signal need to be inverted, but a capacitor is formed between the pixel electrode and the common electrode in the process of the driving signal being inverted. When the voltage of the pixel electrode changes rapidly, the voltage of the common electrode will change instantaneously to maintain the voltage difference of the capacitor. Since the common electrode has a power input, the voltage of the common electrode changes slowly and finally equals the voltage signal of the power supply, that is, in the process of the driving signal being inverted, there is the problem of common electrode signal disturbance, which may easily cause the deviation in the liquid crystal lens morphology and generate the crosstalk to 3D display.

Figure 2:
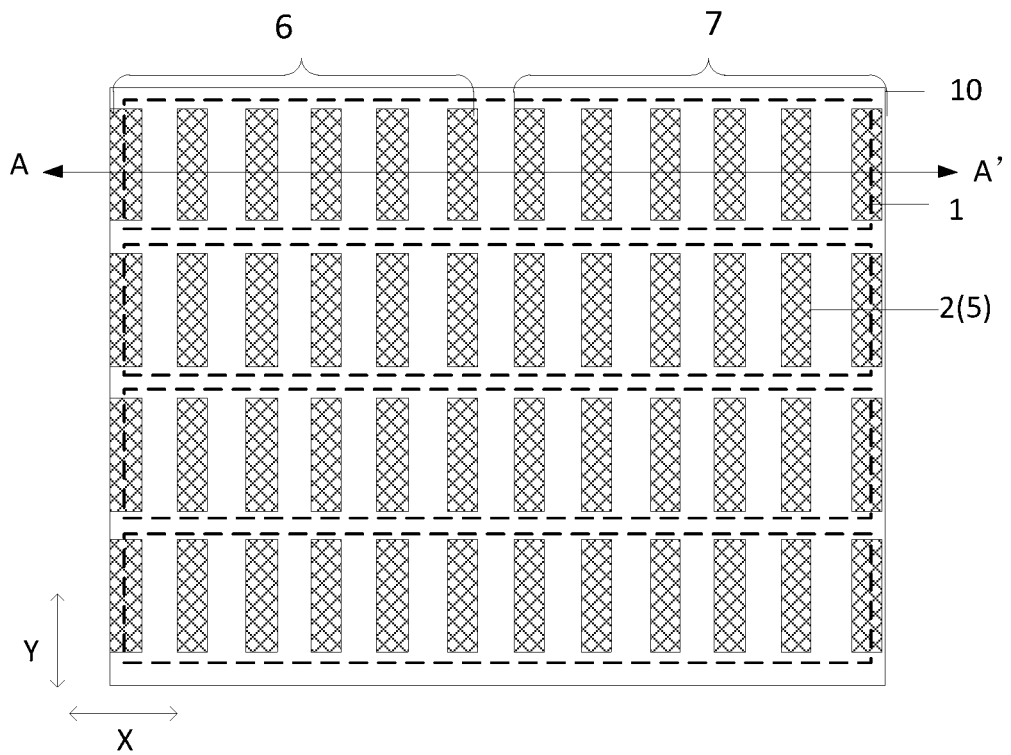
FIG. 2 is a schematic structural diagram of another liquid crystal lens component provided by embodiments of the present disclosure.
Figure 3:
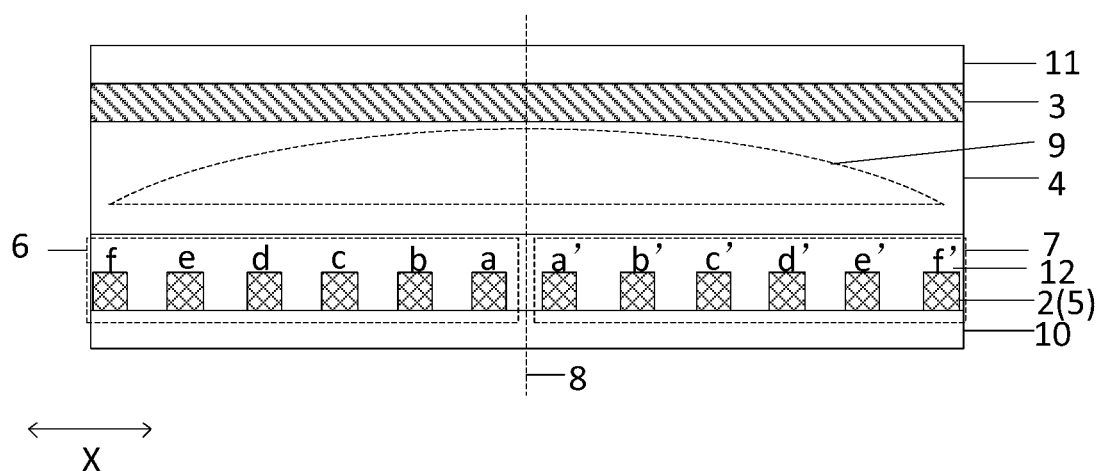
FIG. 3 is a cross-sectional view of AA' in FIG. 1 or FIG. 2 provided by embodiments of the present disclosure.

An embodiment of the present disclosure provides a method for driving a liquid crystal lens component. As shown in FIG. 1, FIG. 2, and FIG. 3, the liquid crystal lens component includes: a plurality of liquid crystal lens units 1 arranged in an array; each of the plurality of liquid crystal lens units 1 includes: a first electrode 2 and a second electrode 3 disposed oppositely, and a liquid crystal layer 4 between the first electrode 2 and the second electrode 3; the first electrode 2 includes: a plurality of first sub-electrodes 5 along a first direction X and extending along a second direction Y, where the first direction X intersects the second direction Y; and the plurality of first sub-electrodes 5 are divided into: a first electrode group 6 and a second electrode group 7 respectively on both sides of a center of the liquid crystal lens unit 1. As shown in FIG. 4, the driving method includes:

S101, applying a common voltage signal to the second electrode and applying a driving signal to the first electrode to control liquid crystals in the liquid crystal layer to be deflected to form a liquid crystal lens; where, the applying a driving signal to the first electrode, includes:

in two image frames that are adjacent to each other, applying driving signals with opposite polarities to the first electrode in one liquid crystal lens unit;

in one image frame, applying driving signals with the same polarity to the plurality of first sub-electrodes in a same first electrode group, applying driving signals with the same polarity to the plurality of first sub-electrodes in a same second electrode group, applying positive voltage driving signals to partial first sub-electrodes of all first sub-electrodes in the liquid crystal lens component, and applying negative voltage driving signal to the remaining first sub-electrodes of all the first sub-electrodes in the liquid crystal lens component.

In the method for driving the liquid crystal lens component provided by the embodiment of the present disclosure, in two image frames that are adjacent to each other, driving signals with opposite polarities are applied to the first electrodes in one liquid crystal lens unit, so that the liquid crystal polarization phenomenon can be avoided. In addition, in one image frame, positive voltage driving signals are applied to partial first sub-electrodes of all the first sub-electrodes in the liquid crystal lens component, and negative voltage driving signals are applied to the remaining first sub-electrodes of all the first sub-electrodes in the liquid crystal lens component. Since the polarity of interference signal caused by the positive pressure signal on the common voltage signal and the polarity of interference signal caused by the negative voltage signal on the common voltage signal are opposite, the recovery time of the driving signal for the second electrode is relatively short, which results the superimposition effect that approximately non-interference, thereby avoiding changes in the morphology of the liquid crystal lens, and avoiding affecting the display effect when the liquid crystal lens component is applied to display products.

It should be noted that, in FIG. 1 and FIG. 2, only one column of liquid crystal lens units 1 is shown, and the first direction X is perpendicular to the second direction Y. In some embodiments, the first sub-electrode is a strip electrode extending along the second direction Y. As shown in FIG. 3, it is a cross-sectional view along AA' in FIG. 1 or FIG. 2, and the dotted line 8 is a connecting line of the centers of the liquid crystal lens units.

In some embodiments, as shown in FIG. 1, each strip-shaped first sub-electrode 5 corresponds to a column of liquid crystal lens units 1 in the second direction Y, that is, a column of liquid crystal lens units 1 along the second direction Y corresponds to the same first electrode group(s)

6 and the same second electrode group(s) 7. Alternatively, as shown in FIG. 2, the first electrodes 2 in the plurality of liquid crystal lens units 1 are independent of each other, that is, the first sub-electrodes 5 in the plurality of liquid crystal lens units 1 are independent of each other.

In some embodiments, when the liquid crystal lens component is applied to display products, in the 3D display mode, the common voltage signal is applied to the second electrode and the driving signal is applied to the first electrode to control liquid crystals in the liquid crystal layer to be deflected to form a liquid crystal lens.

In some embodiments, as shown in FIG. 1, FIG. 2, and FIG. 3, the first electrode group 6 and the second electrode group 7 include the same quantity of first sub-electrodes 5; and from the center of the liquid crystal lens unit to the two edges of the liquid crystal lens unit, absolute values of the driving voltages applied to the first sub-electrodes are distributed with a preset gradient.

In some embodiments, by applying voltages of different absolute values to the first sub-electrodes at different positions, different electric field strengths can be generated at the different positions, so that the liquid crystal molecules in the liquid crystal layer corresponding to the different positions are deflected to different degrees, and thus, the liquid crystal layer acts as a lens. In FIG. 3, the dotted line 9 represents a liquid crystal lens formed by liquid crystal deflection.

In some embodiments, when the liquid crystal molecules are positive liquid crystal molecules, the absolute values of the voltages of the driving signal applied to the first sub-electrodes gradually increases from the center to the two edges of the liquid crystal lens unit; and when the liquid crystal molecules are negative liquid crystal molecules, the absolute values of the voltages of the driving signal applied to the first sub-electrodes decreases gradually from the center to the two edges of the liquid crystal lens unit.

In some embodiments, by applying a voltage to the first electrode and the second electrode in the liquid crystal lens, an electric field is formed between the first electrode and the second electrode, and under the action of the electric field, the refractive index of the liquid crystal layer changes, so that the focal length of the liquid crystal lens unit can be adjusted.

In some embodiments, the center of the liquid crystal lens unit coincides with the center of the liquid crystal lens formed by the liquid crystal deflection. The half of the aperture of the liquid crystal lens is the center of the liquid crystal lens.

In some embodiments, as shown in FIG. 1, FIG. 2, and FIG. 3, when the first electrode group 6 and the second electrode group 7 include the same quantity of first sub-electrodes 5, the first electrode group 6 and the second electrode group 7 are arranged symmetrically on both sides of the center 9 of the liquid crystal lens unit, and the absolute values of the voltages of the driving signals applied to the first sub-electrodes in the first electrode group and the absolute values of the voltages of the driving signals applied to the first sub-electrodes in the second electrode group are symmetrical on both sides of the center of the liquid crystal lens unit, which ensures that the morphology of the liquid crystal lens is symmetrical.

That is, from the center to the edges of the liquid crystal lens unit, the first electrode group includes the $1^{st}$ first sub-electrode to the $n^{th}$ first sub-electrode in sequence, and the second electrode group includes the $1^{st}$ first sub-electrode to the $n^{th}$ first sub-electrode in sequence, wherein n is an integer greater than 1. The it first sub-electrode in the first electrode group is symmetrical to the $i^{th}$ first sub-electrode in the second electrode group with respect to the center of the liquid crystal lens unit; and the absolute value of the voltage of the driving signal applied to the $i^{th}$ first sub-electrode in the first electrode group is equal to the absolute value of the voltage of the driving signal applied to the $i^{th}$ first sub-electrode in the second electrode group, wherein $1 \le i \le n$. Taking the liquid crystal lens component shown in FIG. 3 as an example, the serial numbers of the first sub-electrodes 5 in the first electrode group 6 are respectively a to f, and the serial numbers of the first sub-electrodes 5 in the second electrode group 7 are respectively a' to f'. In one image frame, the absolute value of the voltage of the driving signal of the first sub-electrode numbered a is equal to the absolute value of the voltage of the driving signal of the first sub-electrode numbered a', the absolute value of the voltage of the driving signal of the first sub-electrode numbered b is equal to the absolute value of the voltage of the driving signal of the first sub-electrode numbered b', the absolute value of the voltage of the driving signal of the first sub-electrode numbered c is equal to the absolute value of the voltage of the driving signal of the first sub-electrode numbered c', the absolute value of the voltage of the driving signal of the first sub-electrode numbered d is equal to the absolute value of the voltage of the driving signal of the first sub-electrode numbered d', the absolute value of the voltage of the driving signal of the first sub-electrode numbered e is equal to the absolute value of the voltage of the driving signal of the first sub-electrode numbered e', and the absolute value of the voltage of the driving signal of the first sub-electrode numbered f is equal to the absolute value of the voltage of the driving signal of the first sub-electrode numbered f'.

Figure 6:
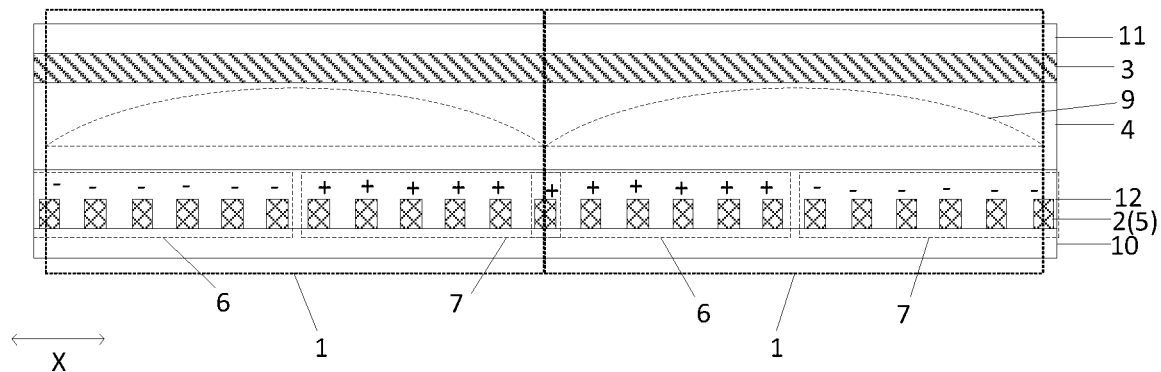
FIG. 6 is a schematic diagram of yet another method for driving a liquid crystal lens component provided by embodiments of the present disclosure.

In some embodiments, the applying a driving signal to the first electrode further includes:

in one image frame, as shown in FIG. 5 and FIG. 6, applying driving signals with opposite polarities to the first electrode group 6 and the second electrode group 7 in each of the plurality of liquid crystal lens unit 1.

It should be noted that, for example, FIG. 5 and FIG. 6 respectively correspond to the $m^{th}$ frame and the $(m+1)^{th}$ image frame, and m is a positive integer.

In some embodiments, as shown in FIG. 5 and FIG. 6, for a certain image frame, for one of the liquid crystal lens units 1, positive voltage driving signals are applied to the first sub-electrodes 5 in the first electrode group 6, and negative voltage driving signals are applied to the first sub-electrodes 5 in the second electrode group 7, and alternatively, negative voltage driving signals are applied to the first sub-electrodes 5 in the first electrode group 6, and positive voltage driving signals are applied to the first sub-electrodes 5 in the second electrode group 7. In some embodiments, for one of the liquid crystal lens units 1, as shown in FIG. 5, when in the current image frame, the positive voltage driving signals are applied to the first sub-electrodes 5 in the first electrode group 6 and the negative voltage driving signals are applied to the first sub-electrodes 5 in the second electrode group 7, then in the next image frame, as shown in FIG. 6, the negative voltage driving signals are applied to the first sub-electrodes 5 in the first electrode group 6, the positive voltage driving signals are applied to the first sub-electrodes 5 in the second electrode group 7.

In some embodiments, as shown in FIG. 5 and FIG. 6, in the first direction X, two liquid crystal lens units 1 that are adjacent to each other share first sub-electrodes 5 at a position at which the two liquid crystal lens units are adjacent. The applying the driving signal to the first electrode includes:

in one image frame, and in the first direction X, applying driving signals with the same polarity to the first electrode group 6 and the second electrode group 7 that are in different liquid crystal lens units 1 and adjacent to each other.

It should be noted that, in some embodiments, two liquid crystal lens units that are adjacent to each other share the first sub-electrode at the position at which the two liquid crystal lens units are adjacent, so that the quantity of first sub-electrodes and the quantity of signal lines connected to the first sub-electrodes can be reduced, and the space of the liquid crystal lens component can be effectively utilized.

In the driving method provided by embodiments of the present disclosure, in one image frame, the driving signals applied to the first electrode group and the second electrode group in one liquid crystal lens unit have opposite polarities, and the driving signals applied to the first electrode group and the second electrode group that are in different liquid crystal lens units and adjacent to each other have the same polarity, so as to avoid the liquid crystal polarization and the interference with the common voltage signal, and facilitate the inversion driving for the shared first sub-electrode at the position at which the two liquid crystal lens units are adjacent.

Figure 7:
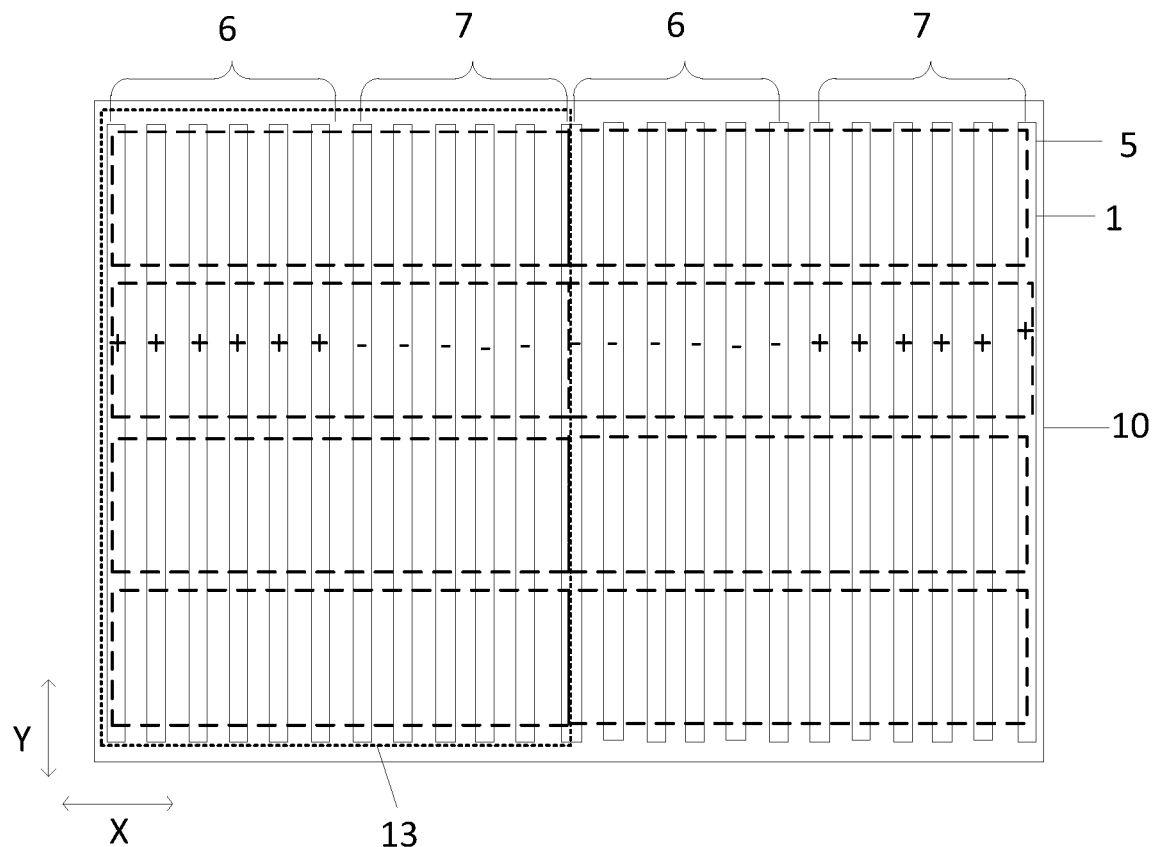
FIG. 7 is a schematic diagram of yet another method for driving a liquid crystal lens component provided by embodiments of the present disclosure.
Figure 8:
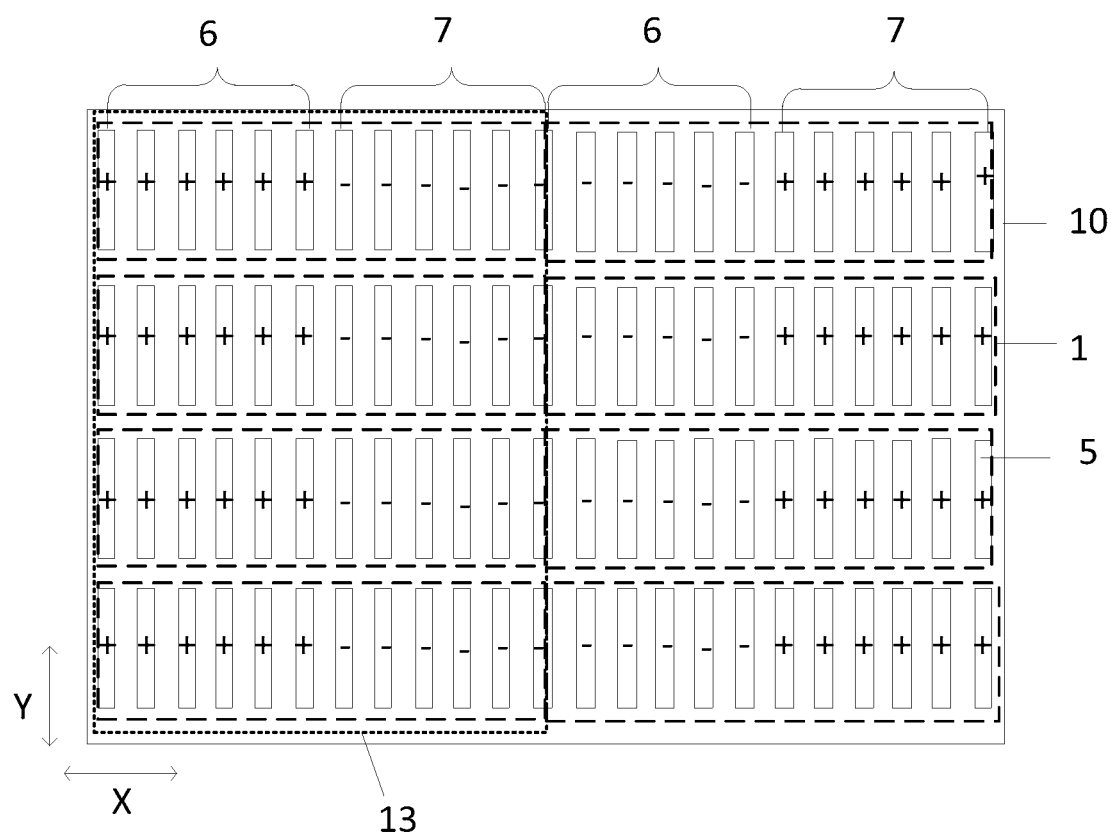
FIG. 8 is a schematic diagram of yet another method for driving a liquid crystal lens component provided by embodiments of the present disclosure.

In some embodiments, as shown in FIG. 7 and FIG. 8, the plurality of liquid crystal lens units are divided into a plurality of liquid crystal lens unit columns 13 extending along the second direction Y and arranged along the first direction X. The applying the driving signal to the first electrode further include:

in one image frame, applying driving signals with the same polarity to first electrode groups 6 in a same liquid crystal lens unit column 13, and applying driving signals with the same polarity to second electrode groups 7 in a same liquid crystal lens unit column 13.

That is, the method for driving the liquid crystal lens component provided by embodiments of the present disclosure is column inversion driving. In the driving method provided by embodiments of the present disclosure, the liquid crystal lens component is driven by the column inversion, which can reduce power consumption while avoiding the liquid crystal polarization and the interference with the common voltage signal.

In some embodiments, for example, for one liquid crystal lens unit column, in the current image frame, the positive voltage driving signal is applied to the first electrode group in this liquid crystal lens unit column and the negative voltage driving signal is applied to the second electrode group in this liquid crystal lens unit column, and then in the next image frame, the negative voltage driving signal is applied to the first electrode group in this liquid crystal lens unit column and the positive voltage driving signal is applied to the second electrode group in this liquid crystal lens unit column. In some embodiments, the liquid crystal lens unit columns in the odd-numbered columns are of the same mode of applying driving signals, the liquid crystal lens unit columns in the even-numbered columns are of the same mode of applying driving signals, and the liquid crystal lens unit columns in the odd-numbered columns are of the mode of applying driving signals opposite to that of the liquid crystal lens unit columns in the even-numbered columns. That is, in the odd-numbered liquid crystal lens unit columns, the polarities of the driving signals applied to the first electrode groups are the same, and the polarities of the driving signals applied to the second electrode groups are the same; and in the even-numbered liquid crystal lens unit columns, the polarities of the driving signals applied to the first electrode groups are the same, and the polarities of the driving signals applied to the second electrode groups are the same. The polarity of the driving signal applied to the first electrode group in the odd-numbered liquid crystal lens unit column is opposite to the polarity of the driving signal applied to the first electrode group in the even-numbered liquid crystal lens unit column, and the polarity of the driving signal applied to the second electrode group in the odd-numbered liquid crystal lens unit column is opposite to t the polarity of the driving signal applied to the second electrode group in the even-numbered liquid crystal lens unit column.

Figure 9:
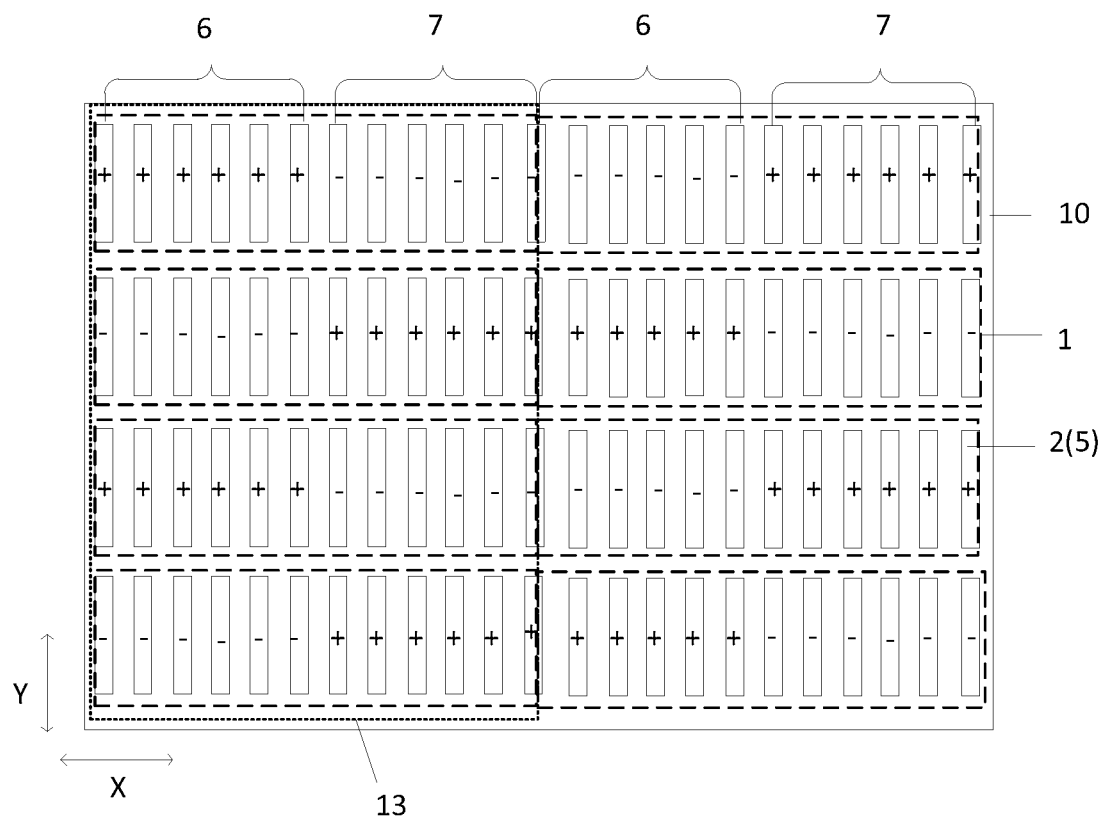
FIG. 9 is a schematic diagram of yet another method for driving a liquid crystal lens component provided by embodiments of the present disclosure.

In some embodiments, as shown in FIG. 9, the first electrodes 2 in the plurality of liquid crystal lens units 1 are independent of each other, that is, the first sub-electrodes 5 in the plurality of liquid crystal lens units 1 are independent of each other; the plurality of liquid crystal lens units 1 are divided into a plurality of liquid crystal lens unit columns 13 extending along the second direction Y and arranged along the first direction X. The applying the driving signal to the first electrode further include:

in one image frame, applying driving signals with opposite polarities to first electrode groups 6 that are adjacent to each other in a same liquid crystal lens unit column 13, and applying driving signals with opposite polarities to second electrode groups 7 that are adjacent to each other in a same liquid crystal lens unit column 13.

In some embodiments, as shown in FIG. 9, in one image frame, driving signals with opposite polarities are applied to the first electrode group 6 and the second electrode group 7 in each liquid crystal lens unit 1, and in the first direction X, driving signals with the same polarity are applied to the first electrode group 6 and the second electrode group 7 that are adjacent to each other and in different liquid crystal lens units 1. As shown in FIG. 9, in one liquid crystal lens unit column 13, the liquid crystal lens units 1 in odd-numbered rows are of the same mode of applying driving signals, the liquid crystal lens units 1 in even-numbered rows are of the same mode of applying driving signals, and the liquid crystal lens units 1 in the odd-numbered rows are of the mode of applying driving signals opposite to that of the liquid crystal lens units 1 in even-numbered rows. That is, in the liquid crystal lens units 1 in the odd-numbered rows, the polarities of the driving signals applied to the first electrode groups 6 are the same, and the polarities of the driving signals applied to the second electrode groups 7 are the same; and in the liquid crystal lens units 1 in the even-numbered rows, the polarities of the driving signals applied to the first electrode groups 6 are the same, and the polarities of the driving signals applied to the second electrode groups 7 are the same. The polarities of the driving signals applied to the first electrode groups 6 in the liquid crystal lens units 1 in the odd-numbered rows are opposite to the polarities of the driving signals applied to the first electrode groups 6 in the liquid crystal lens units 1 in the even-numbered rows, and the polarities of the driving signals applied to the second electrode groups 7 in the liquid crystal lens units 1 in the odd-numbered rows are opposite to the polarities of the driving signals applied to the second electrode groups 7 in the liquid crystal lens units 1 in the even-numbered rows.

In the driving method shown in FIG. 9 provided by the embodiment of the present disclosure, the modes of applying the driving signals to the first sub-electrodes in any adjacent liquid crystal lens units are different, which can further shorten the recovery time of the driving signal, avoid the interference with the common voltage signal, and can further improve the display effect.

Figure 10:
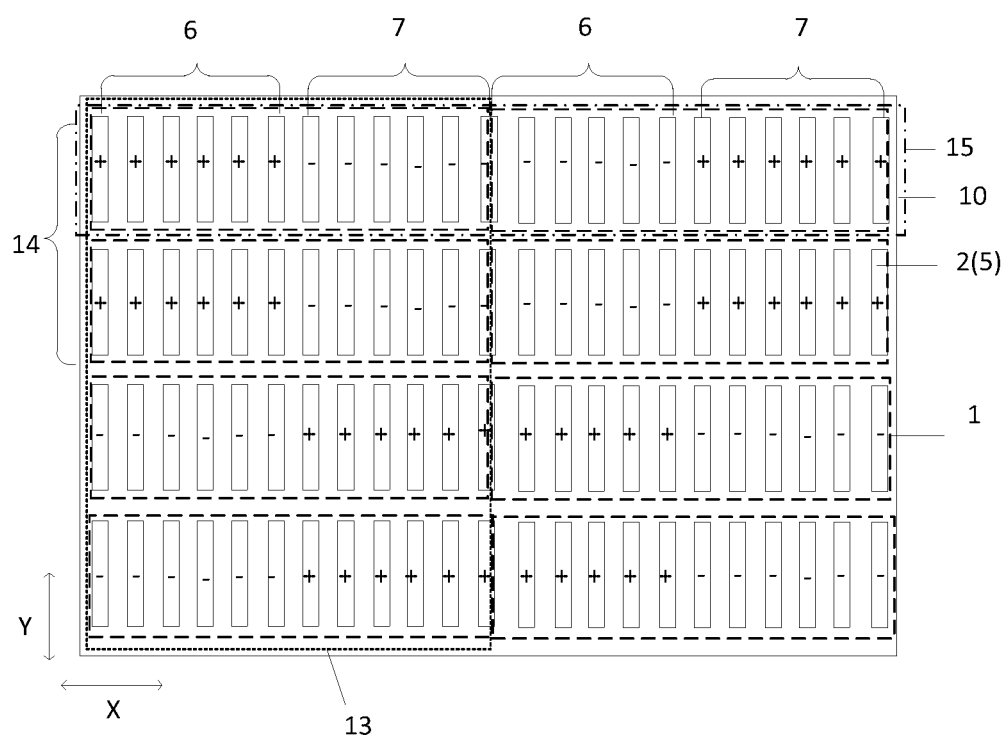
FIG. 10 is a schematic diagram of yet another method for driving a liquid crystal lens component provided by embodiments of the present disclosure.

In some embodiments, as shown in FIG. 10, the first electrodes 2 in the plurality of liquid crystal lens units 1 are independent of each other, that is, the first sub-electrodes 5 in the plurality of liquid crystal lens units 1 are independent of each other; the plurality of liquid crystal lens units 1 are divided into a plurality of liquid crystal lens unit columns 13 extending along the second direction Y and arranged along the first direction X; and the plurality of liquid crystal lens units 1 are further divided into a plurality of liquid crystal lens unit groups 14 arranged along the second direction Y, and each liquid crystal lens unit group 14 includes a plurality of liquid crystal lens unit rows 15 extending along the first direction X. The applying the driving signal to the first electrode further includes:

in one image frame, applying driving signals with the same polarity to first electrode groups 6 in a same liquid crystal lens unit group 14 in one liquid crystal lens unit column 13, applying driving signals with the same polarity to second electrode groups 7 in a same liquid crystal lens unit group 14 in one liquid crystal lens unit column 13, applying driving signals with the opposite polarities to the first electrode groups 6 in liquid crystal lens unit groups 14 that are adjacent to each other in one liquid crystal lens unit column 13, and applying driving signals with the opposite polarities to the second electrode groups 8 in liquid crystal lens unit groups 14 that are adjacent to each other in one liquid crystal lens unit column 13.

In some embodiments, as shown in FIG. 10, in one image frame, driving signals with opposite polarities are applied to the first electrode group 6 and the second electrode group 7 in each liquid crystal lens unit 1, and in the first direction X, driving signals with the same polarity are applied to the first electrode group 6 and the second electrode group 7 that are adjacent to each other and in different liquid crystal lens units 1. As shown in FIG. 10, in one liquid crystal lens unit column 13, the liquid crystal lens units 1 in odd-numbered liquid crystal lens unit groups 14 are of the same mode of applying driving signals, the liquid crystal lens units 1 in even-numbered liquid crystal lens unit groups 14 are of the same mode of applying driving signals, and the liquid crystal lens units 1 in the odd-numbered liquid crystal lens unit groups 14 are of the same mode of applying driving signals opposite to that of the liquid crystal lens units 1 in the even-numbered liquid crystal lens unit groups 14. That is, in the odd-numbered liquid crystal lens unit groups 14, the polarities of the driving signals applied to the first electrode groups 6 are the same, and the polarities of the driving signals applied to the second electrode groups 7 are the same; and in the even-numbered liquid crystal lens unit groups 14, the polarities of the driving signals applied to the first electrode groups 6 are the same, and the polarities of the driving signals applied to the second electrode groups 7 are the same, the polarities of the driving signals applied to the first electrode groups 6 in the odd-numbered liquid crystal lens unit groups 14 are opposite to the polarities of the driving signals applied to the first electrode groups 6 in the even-numbered liquid crystal lens unit groups 14; and the polarities of the driving signals applied to the second electrode groups 7 in the odd-numbered liquid crystal lens unit groups 14 are opposite to the polarities of the driving signals applied to the second electrode groups 7 in the even-numbered liquid crystal lens unit groups 14.

It should be noted that in FIG. 10, each liquid crystal lens unit group 14 includes two liquid crystal lens unit rows 15 as an example for illustration. In some embodiments, each liquid crystal lens unit group may include more liquid crystal lens unit rows.

In the driving method provided by the embodiments of the present disclosure, the modes of applying the driving signals to the first sub-electrodes in the liquid crystal lens units in any two adjacent liquid crystal lens unit groups are different, and the modes of applying the driving signals to the first sub-electrodes in the liquid crystal lens units in one liquid crystal lens unit group are the same way, which can avoid increasing power consumption while shortening the recovery time of the driving signal.

Figure 11:
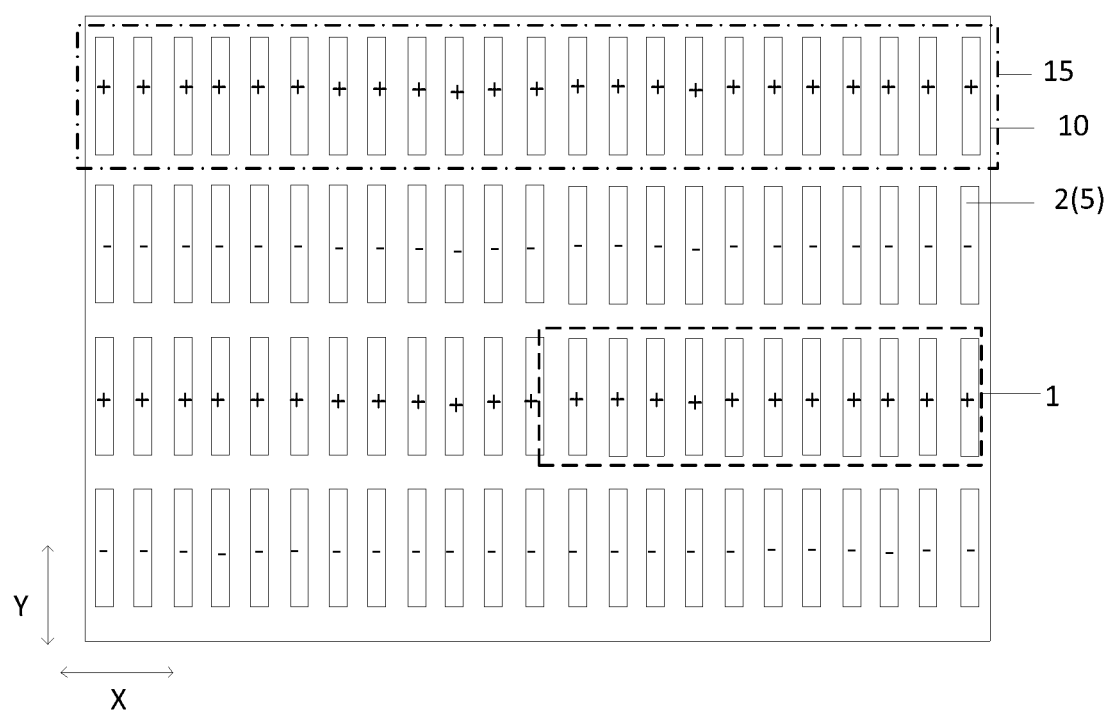
FIG. 11 is a schematic diagram of yet another method for driving a liquid crystal lens component provided by embodiments of the present disclosure.

In some embodiments, as shown in FIG. 11, the first electrodes 2 in the plurality of liquid crystal lens units 1 are independent of each other, that is, the first sub-electrodes 5 in the plurality of liquid crystal lens units 1 are independent of each other; and the plurality of liquid crystal lens units 1 are divided into a plurality of liquid crystal lens unit rows 15 extending along the first direction X and arranged along the second direction Y. The applying the driving signal to the first electrode further includes:

in one image frame, applying driving signals with the same polarity to first sub-electrodes 5 in a same liquid crystal lens unit row 15, and applying driving signals with opposite polarities to first sub-electrodes 5 in the liquid crystal lens unit rows 15 that are adjacent to each other.

In some embodiments, in the current image frame, positive voltage driving signals are applied to the first sub-electrodes in the odd-numbered liquid crystal lens unit rows, and negative voltage driving signals are applied to the first sub-electrodes in the even-numbered liquid crystal lens unit rows; and in the next image frame, negative voltage driving signals are applied to the first sub-electrodes in the odd-numbered liquid crystal lens unit rows, and positive voltage driving signals are applied to the first sub-electrodes in the even-numbered liquid crystal lens unit rows.

That is, the method for driving the liquid crystal lens component provided by the embodiment of the present disclosure is row inversion driving. In the driving method provided by the embodiments of the present disclosure, the liquid crystal lens component is driven by the row inversion, which can reduce power consumption while avoiding the liquid crystal polarization and the interference with the common voltage signal.

Figure 12:
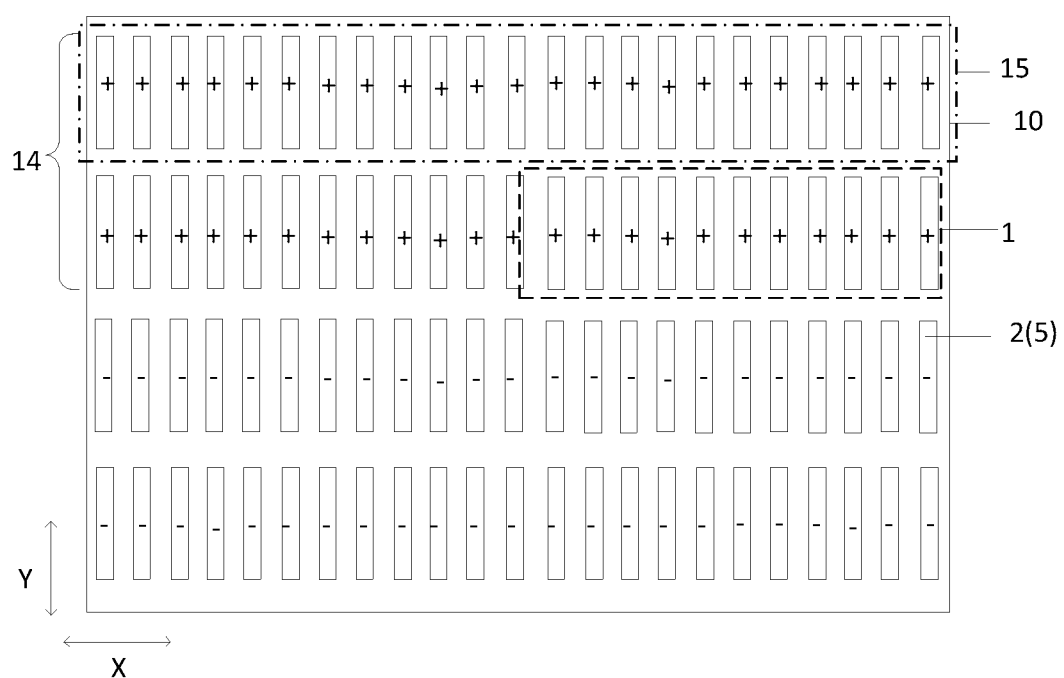
FIG. 12 is a schematic diagram of yet another method for driving a liquid crystal lens component provided by embodiments of the present disclosure.

In some embodiments, as shown in FIG. 12, first electrodes 2 in the plurality of liquid crystal lens units 1 are independent of each other, that is, the first sub-electrodes 5 in the plurality of liquid crystal lens units 1 are independent of each other; and the plurality of liquid crystal lens units 1 are divided into a plurality of liquid crystal lens unit groups 14 arranged along the second direction Y, and each liquid crystal lens unit group 14 includes a plurality of liquid crystal lens unit rows 15 extending along the first direction X;

where the applying the driving signal to the first electrode includes:
in one image frame, applying driving signals with the same polarity to the first sub-electrodes 5 in a same liquid crystal lens unit group 14, and applying driving signals with opposite polarities to the first sub-electrodes 5 in two liquid crystal lens unit groups 14 that are adjacent to each other.

That is, the method for driving the liquid crystal lens component provided by the embodiment of the present disclosure is point inversion driving. In the driving method provided by the embodiments of the present disclosure, the liquid crystal lens component is driven by the point inversion, which can further shorten the recovery time of the driving signal, avoid the interference with the common voltage signal, and can further improve the display effect.

In some embodiments, in the current image frame,
positive voltage driving signals are applied to the first sub-electrodes in odd-numbered liquid crystal lens unit groups, and negative voltage driving signals are applied to the first sub-electrodes in even-numbered liquid crystal lens unit groups; and in the next image frame, negative voltage driving signals are applied to the first sub-electrodes in the odd-numbered liquid crystal lens unit groups, and positive voltage driving signals are applied to the first sub-electrodes in the even-numbered liquid crystal lens unit groups.

It should be noted that in FIG. 12, each liquid crystal lens unit group 14 includes two liquid crystal lens unit rows 15 as an example for illustration. In some embodiments, each liquid crystal lens unit group may include more liquid crystal lens unit rows.

Figure 13:
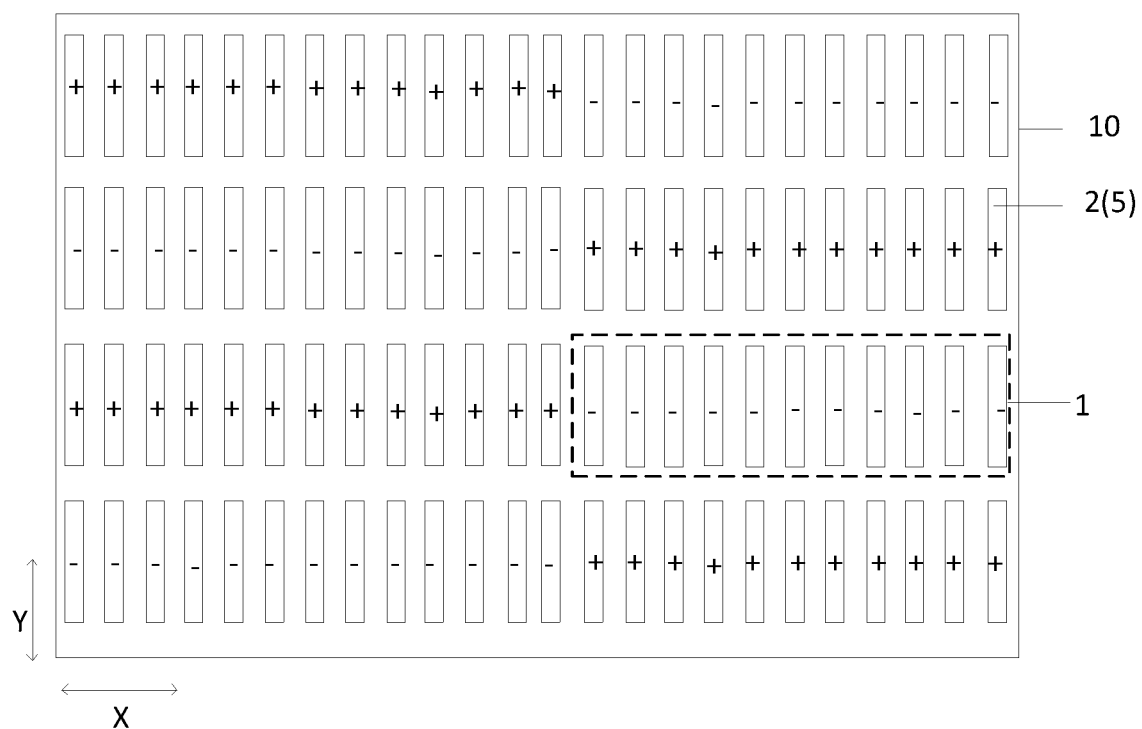
FIG. 13 is a schematic diagram of yet another method for driving a liquid crystal lens component provided by embodiments of the present disclosure.

In some embodiments, as shown in FIG. 13, the first electrodes 2 in a plurality of liquid crystal lens units 1 are independent of each other, that is, the first sub-electrodes 5 in the plurality of liquid crystal lens units 1 are independent of each other. The applying the driving signal to the first electrode further includes:
in one image frame, applying driving signals with the same polarity to the first sub-electrodes 5 in a same liquid crystal lens unit 1, and applying driving signals with opposite polarities to the first sub-electrodes 5 in liquid crystal lens units 1 that are adjacent to each other.

In some embodiments, as shown in FIG. 13, for example, the liquid crystal lens units that are adjacent to each other along the first direction do not share the first sub-electrode at the position at which the liquid crystal lens units that are adjacent to each other.

It should be noted that, FIGS. 1 to 13 are illustrated by taking the first electrode in each liquid crystal lens unit to include only the first sub-electrodes as an example, that is, the first electrode in each liquid crystal lens unit includes an even number of strip-shaped sub-electrodes. Of course, in actual implementation, the first electrode in each liquid crystal lens unit may also include an odd number of strip-shaped sub-electrodes.

Figure 14:
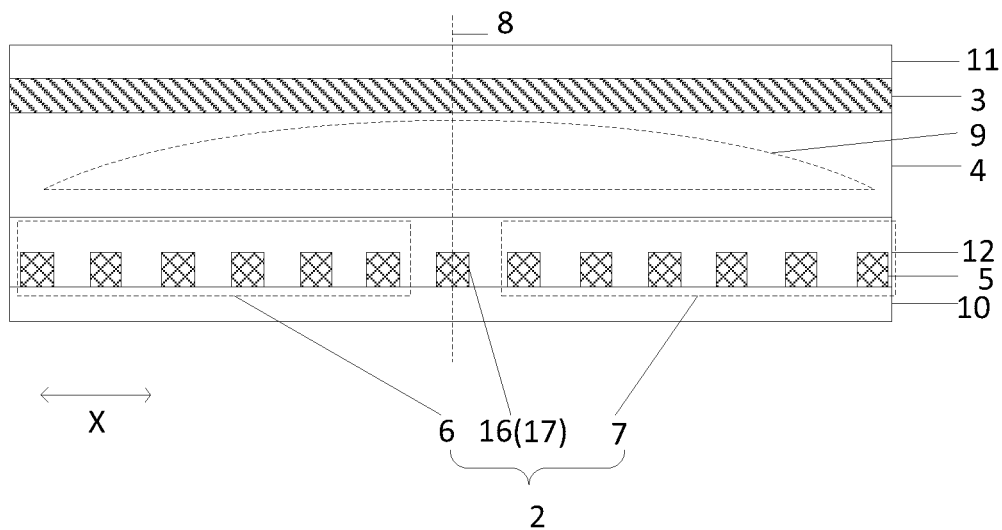
FIG. 14 is a schematic diagram of yet another method for driving a liquid crystal lens component provided by embodiments of the present disclosure.

In some embodiments, as shown in FIG. 14, the first electrode 2 further includes: a third electrode group 16 between the first electrode group 6 and the second electrode group 7. The applying a driving signal to the first electrode further includes:
applying the common voltage signal to the third electrode group.

In some embodiments, as shown in FIG. 14, the third electrode group 16 includes at least one second sub-electrode 17 extending along the second direction Y; and an orthographic projection of the center 9 of the liquid crystal lens unit 1 on the liquid crystal layer 1 is located in an orthographic projection of one of the at least one second sub-electrode 17 in the third electrode group on the liquid crystal layer. The applying the common voltage signal to the third electrode group includes:
applying the common voltage signal to the at least one second sub-electrodes.

It should be noted that in FIG. 14, the third electrode group 1 includes one second sub-electrode 17 extending along the second direction Y as an example for illustration.

Figure 15:
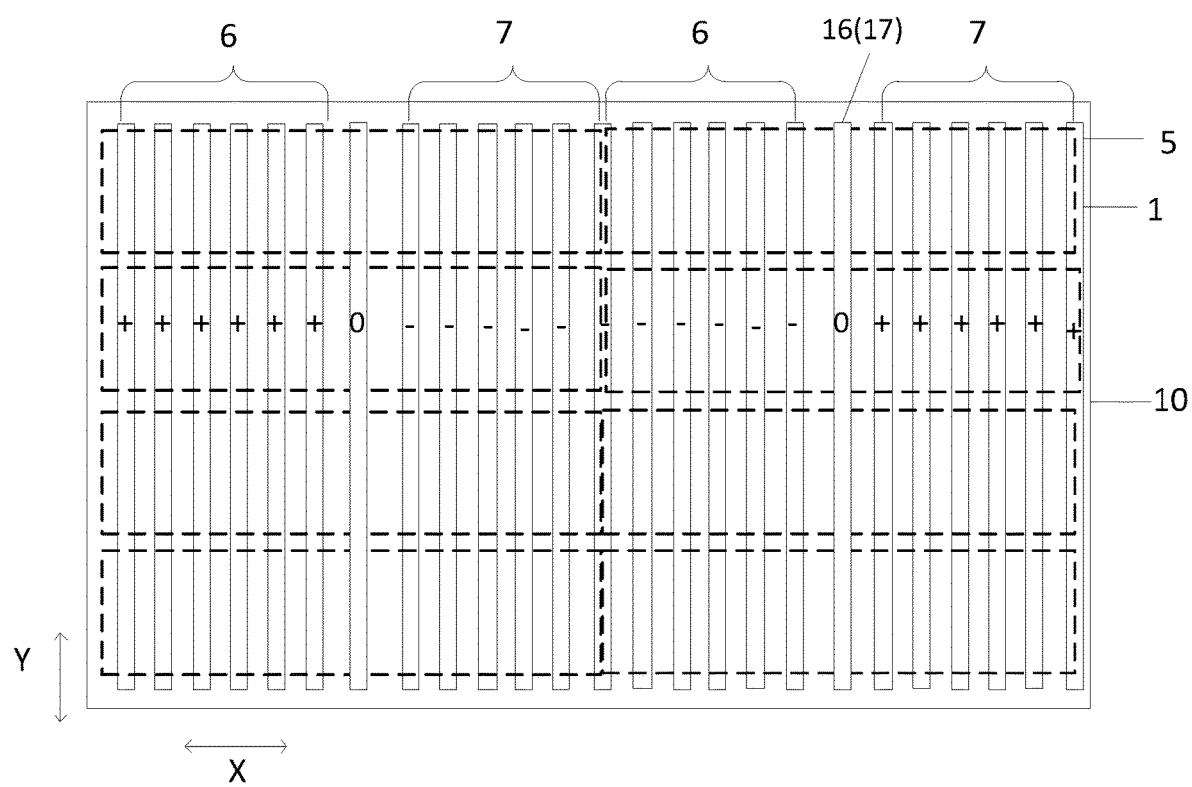
FIG. 15 is a schematic diagram of yet another method for driving a liquid crystal lens component provided by embodiments of the present disclosure.

It should be noted that the first sub-electrode and the second sub-electrode are formed with the same material and the same process. As shown in FIG. 15, when each strip-shaped first sub-electrode 5 corresponds to a column of liquid crystal lens units in the second direction Y, and each strip-shaped second sub-electrode 17 also corresponds to a column of liquid crystal lens units in the second direction Y, each strip-shaped first sub-electrode 5 and each strip-shaped second sub-electrode 17 have the same length in the second direction Y. Alternatively, as shown in FIG. 16, the second sub-electrodes 17 in the plurality of liquid crystal lens units 1 are independent of each other.

It should be noted that no matter how the second sub-electrode is set, no matter which inversion driving method is adopted, the driving signal applied to the second sub-electrode is the common voltage signal, that is, the same driving signals are applied to the second sub-electrode and the second electrode.

Figure 16:
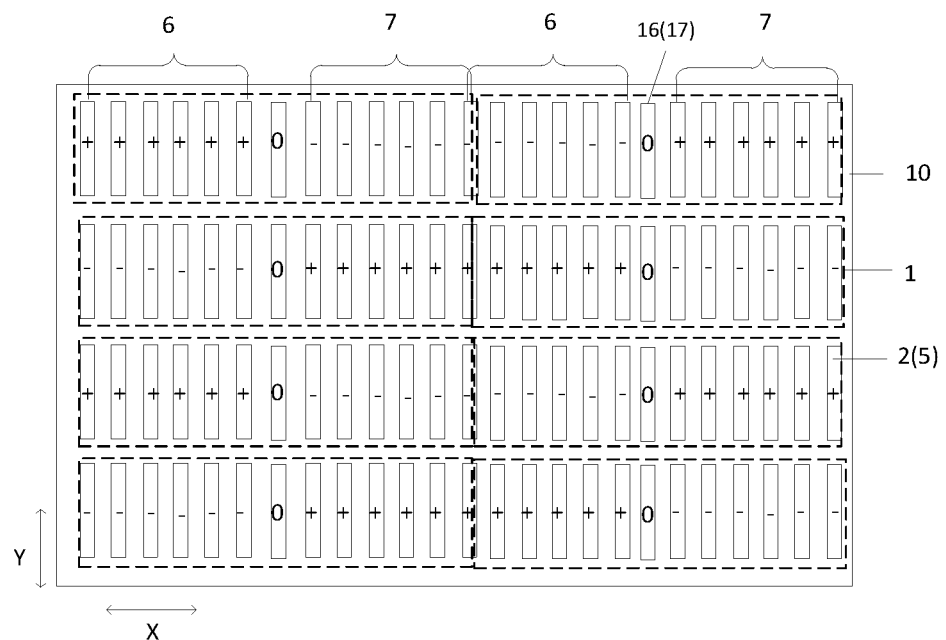
FIG. 16 is a schematic diagram of yet another method for driving a liquid crystal lens component provided by embodiments of the present disclosure.

It should be noted that in FIG. 15 and FIG. 16, driving signals with opposite polarities are applied to the first electrode group 6 and the second electrode group 7 in each liquid crystal lens unit 1 in one image frame as an example for illustration, and in the first direction X, driving signals with the same polarity are applied to the first electrode group 6 and the second electrode group 7 that are adjacent to each other and in different liquid crystal lens units 1. In some embodiments, when the first electrode further includes the second sub-electrodes, the mode for driving the first sub-electrodes may adopt any of the modes shown in FIGS. 7 to 13.

In some embodiments, the common voltage signal is a zero voltage signal.

Based on the same inventive concept, an embodiment of the present disclosure also provides a liquid crystal lens component, as shown in FIG. 1, FIG. 2, and FIG. 3, the liquid crystal lens component includes: a plurality of liquid crystal lens units 1 arranged in an array; each of the plurality of liquid crystal lens units 1 includes: a first electrode 2 and a second electrode 3 disposed oppositely, and a liquid crystal layer 4 between the first electrode 2 and the second electrode 3; the first electrode 2 includes: a plurality of first sub-electrodes 5 along a first direction X and extending along a second direction Y, the first direction X intersects the second direction Y; and the plurality of first sub-electrodes 5 are divided into: a first electrode group 6 and a second electrode group 7 respectively on both sides of a center of the liquid crystal lens unit 1. The liquid crystal lens component is driven by the method provided by the embodiments of the present disclosure.

In some embodiments, as shown in FIG. 1, FIG. 2, and FIG. 3, the first electrode group 6 and the second electrode group 7 include the same quantity of first sub-electrodes 5; and the first electrode group 6 and the second electrode group 7 are arranged symmetrically on both sides of the center 9 of the liquid crystal lens unit.

In some embodiments, as shown in FIG. 1, FIG. 2 and FIG. 3, the widths of the first sub-electrodes 5 in the first direction X are all equal, and the distance between the first sub-electrodes 5 in the first electrode group 6 is equal, the distance between the first sub-electrodes 5 in the second electrode group 7 is equal. Of course, in actual implementation, the widths of the first sub-electrodes may not be completely equal, and the distances between adjacent first sub-electrodes may also be unequal.

In some embodiments, as shown in FIG. 2, in the second direction, the lengths of the first sub-electrodes 5 are equal, and the distances between adjacent first sub-electrodes 5 are equal.

Of course, in actual implementation, in the second direction, the lengths of the first sub-electrodes may also be unequal, and the distances between adjacent first sub-electrodes may also be unequal.

In some embodiments, as shown in FIGS. 14 to 16, the first electrode 2 further includes the second sub-electrode(s) 17.

In some embodiments, the width of the first sub-electrode is equal to the width of the second sub-electrode. Alternatively, the width of the first sub-electrode may not be equal to the width of the second sub-electrode.

In some embodiments, the second electrodes in the plurality of liquid crystal lens units are integrally connected. That is, the second electrode is a planar electrode.

In some embodiments, both the first electrode and the second electrode are transparent electrodes. The material of the transparent electrode includes, e.g., indium tin oxide (ITO).

In some embodiments, as shown in FIG. 3, the liquid crystal lens component further includes: a first base substrate 10, a second base substrate 11, and a protective layer 12.

In some embodiments, the first base substrate, the first electrode and the protective layer form the lower substrate, that is, the first electrode and the protective layer are sequentially disposed on the first base substrate, and the second base substrate and the second electrode form the upper substrate, that is, the second electrode is disposed on the second substrate. In some embodiments, the liquid crystals are injected between the upper substrate and the lower substrate by using a box aligning process to obtain a liquid crystal lens component. In some embodiments, alignment layers may be disposed on the side of the liquid crystal layer facing the lower substrate and the side of the liquid crystal layer facing the upper substrate, respectively.

In some embodiments, the liquid crystal lens component further includes a signal line electrically connected to the first electrode.

In some embodiments, for the case where one strip-shaped first sub-electrode corresponds to a column of liquid crystal lens units, the signal line may be electrically connected to the first sub-electrode at any end of the strip-shaped first sub-electrode in the direction along which the strip-shaped first sub-electrode extend. In the case where the first electrodes corresponding to a plurality of liquid crystal lens units are independent of each other, for example, each row of liquid crystal lens units is electrically connected to a group of signal lines, and the group of signal lines can be arranged, e.g., between liquid crystal lens unit rows that are adjacent to each other. For example, the quantity of signal lines in each group of signal lines may be the same as the quantity of first sub-electrodes in the first electrode group.

It should be noted that in actual implementation, different parameters of the liquid crystal lens component and changes in the voltages of the driving signals can be designed according to different 3D design schemes. Next, the structural parameters and driving signals of different liquid crystal lens components are introduced with examples. The structural parameters of different liquid crystal lens components are shown in Table 1, and the absolute values of the voltages of the driving signals of the first electrode in the liquid crystal lens units in different liquid crystal lens components are shown in Tables 2 to 5. Among them, the quantity of sub-electrodes in Table 1 refers to the sum of the quantity of first sub-electrodes and the quantity of second sub-electrodes included in each first electrode; when the quantity of sub-electrodes is an even number, the first electrode only includes the first sub-electrodes, and when the quantity of sub-electrodes is an odd number, the first electrode includes one second sub-electrode, and the rest included in the first electrode are first sub-electrodes. Tables 2 to 5 respectively correspond to Case 1 to Case 4 in Table 1. In Table 2 and Table 4, electrodes corresponding to electrode serial numbers 1 to 11 are the first sub-electrodes in the first electrode group, electrodes corresponding to electrode serial numbers 13 to 23 are the first sub-electrodes in the second electrode group, an electrode corresponding to an electrode serial number 12 is the second sub-electrode, the electrodes with electrode serial numbers 11 and 13 are the first sub-electrodes closest to the center of the liquid crystal lens unit, electrodes with electrode serial numbers 1 and 23 are the first sub-electrodes at the edges of the liquid crystal lens unit. In Table 3 and Table 5, electrodes corresponding to electrode serial numbers 1-6 are the first sub-electrodes in the first electrode group, electrodes corresponding to electrode serial numbers 7-12 are the first sub-electrodes in the second electrode group, electrodes corresponding to the electrode serial numbers 6 and 7 are the first sub-electrodes closest to the center of the liquid crystal lens unit, and electrodes with the electrode serial numbers 1 and 12 are the first sub-electrodes at the edges of the liquid crystal lens unit.

TABLE 1

|  | Case 1 | Case 2 | Case 3 | Case 4 |
| --- | --- | --- | --- | --- |
| Aperture of lens (micron) | 155.82 | 77.055 | 155.82 | 77.055 |
| Focal length of lens (micron) | 850 | 570 | 725 | 485 |
| Thickness of liquid crystal layer (micron) | 23.3 | 12.5 | 23.3 | 12.5 |
| Quantity of sub-electrodes | 23 | 12 | 23 | 12 |
| Cycle of sub-electrodes (micron) | 7.08 | 7.005 | 7.08 | 7.005 |
| Width of sub-electrodes (micron) | 4 | 4 | 4 | 4 |

TABLE 2

| | Electrode serial numbers | | | | | | | | | | | |
| --- | --- | --- | --- | --- | --- | --- | --- | --- | --- | --- | --- | --- |
| | 1 | 2 | 3 | 4 | 15 | 6 | 7 | 18 00 | 9 | 10 | 11 | 12 |
| Absolute values of voltages (V) | 2.44 | 2.08 | 1.93 | 1.81 | 1.71 | 1.62 | 1.55 | 1.48 | 1.43 | 1.39 | 1.34 | 10 |

| | Electrode serial numbers | | | | | | | | | | |
| --- | --- | --- | --- | --- | --- | --- | --- | --- | --- | --- | --- |
| | 13 | 14 | 15 | 16 | 17 | 18 | 19 | 20 | 21 | 22 | 23 |
| Absolute values of voltages (V) | 1.34 | 1.39 | 1.43 | 1.48 | 1.55 | 1.62 | 1.71 | 1.81 | 1.93 | 2.08 | 12.44 |

TABLE 3

| | Electrode serial numbers | | | | | | | | | | | |
|---|---|---|---|---|---|---|---|---|---|---|---|---|
| | 1 | 2 | 3 | 4 | 5 | 6 | 7 | 00 | 9 | 10 | 11 | 12 |
| Absolute values of voltages (V) | 2.03 | 1.72 | 1.57 | 1.43 | 1.3 | 0.95 | 0.95 | 1.3 | 1.43 | 1.57 | 1.72 | 2.03 |

TABLE 4

| | Electrode serial numbers | | | | | | | | | | | |
|---|---|---|---|---|---|---|---|---|---|---|---|---|
| | 1 | 2 | 3 | 4 | 5 | 6 | 7 | 18 | 9 | 10 | 11 | 12 |
| Absolute values of voltages (V) | 3.09 | 2.46 | 2.18 | 1.99 | 1.83 | 1.71 | 1.61 | 1.53 | 1.46 | 1.4 | 1.33 | 0 |

| | Electrode serial numbers | | | | | | | | | | |
|---|---|---|---|---|---|---|---|---|---|---|---|
| | 13 | 14 | 15 | 16 | 17 | 18 | 19 | 20 | 21 | 22 | 23 |
| Absolute values of voltages (V) | 1.33 | 1.4 | 1.46 | 1.53 | 1.61 | 1.71 | 1.83 | 1.99 | 2.18 | 2.46 | 3.09 |

TABLE 5

| | Electrode serial numbers | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Absolute values of voltages (V) | 2.15 | 1.79 | 1.61 | 1.47 | 1.32 | 0.97 | 0.97 | 1.32 | 1.47 | 1.61 | 1.79 | 2.15 |

Figure 17:
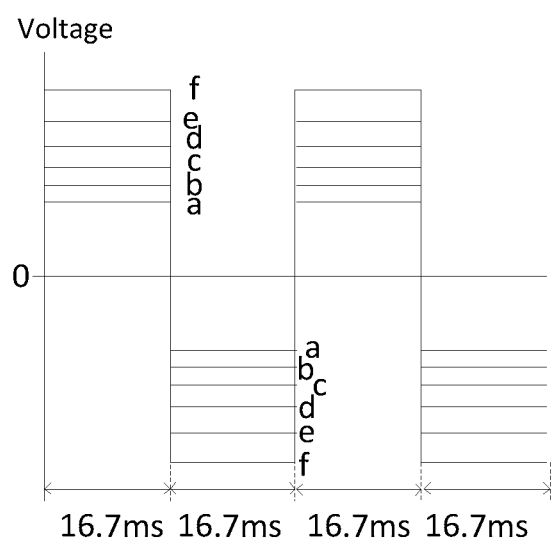
FIG. 17 is a timing diagram of a method for driving a liquid crystal lens component provided by embodiments of the present disclosure.

Taking the liquid crystal lens component shown in FIG. 3 as an example, if the driving frequency is 60 hertz (Hz), the polarity of the voltage of the driving signal is inverted every 16.7 milliseconds (ms). In the liquid crystal lens component shown in FIG. 3, the timing diagram of driving signals of the first electrode group is shown in FIG. 17. It should be noted that the serial numbers of the first sub-electrodes in the first electrode group in FIG. 3 are respectively a to f, the serial numbers of the first sub-electrodes in the second electrode group are respectively a' to f', and the absolute values of the voltages of the first sub-electrodes a' to f' are respectively equal to the absolute values of the voltages of the first sub-electrodes a to f.

Figure 18:
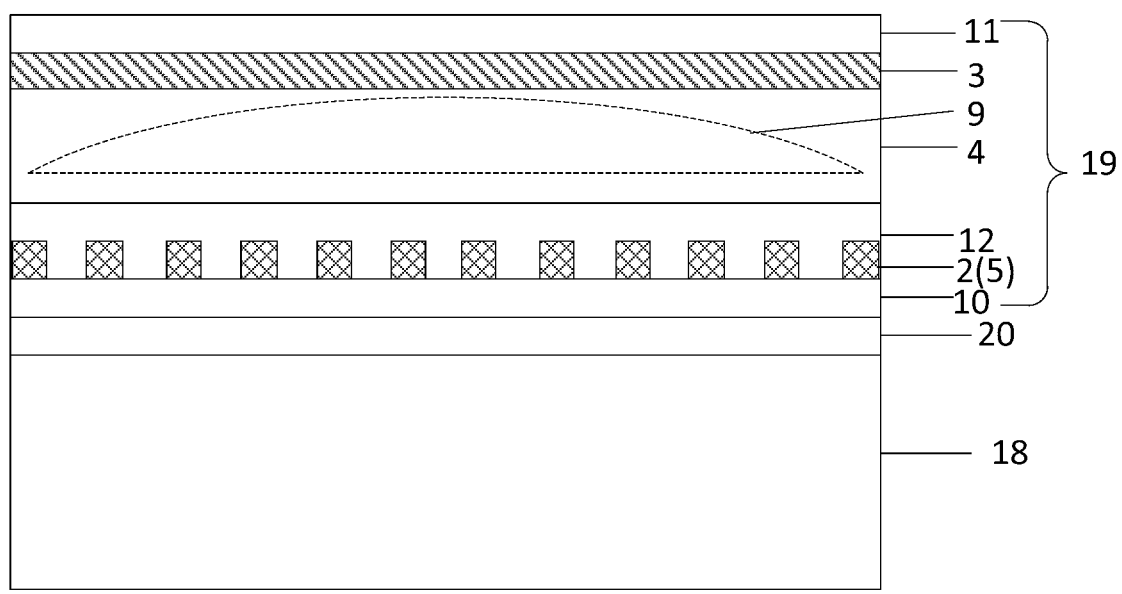
FIG. 18 is a schematic structural diagram of a display device provided by embodiments of the present disclosure.

A display device provided by an embodiment of the present disclosure, as shown in FIG. 18, includes: a display panel 18, and the liquid crystal lens component 19 provided by the embodiment of the present disclosure on the display side of the display panel 18.

In some embodiments, the display device provided by the embodiments of the present disclosure can realize switching between the 2D display mode and the 3D display mode. The 2D display mode can control the normal light transmission of the liquid crystal lens component. In the 3D display mode, the method for driving the liquid crystal lens component provided by the embodiments of the present disclosure can be used to drive the liquid crystal lens unit array in the liquid crystal lens component to form the liquid crystal lens.

In some embodiments, the display panel is a liquid crystal display panel. When the display panel is a liquid crystal display panel, the display device may further include a backlight component on a side of the display panel away from the liquid crystal lens component.

In some embodiments, the display panel is an electroluminescent display panel, e.g., an organic light emitting diode display panel or a quantum dot light emitting diode display panel, etc.

In some embodiments, as shown in FIG. 18, the display device further includes: the bonding glue 20 between the display panel 18 and the liquid crystal lens component 19. That is, the display panel and the liquid crystal lens component are bonded by the bonding glue.

In some embodiments, the display panel includes a plurality of pixel units arranged in an array, and each liquid crystal lens unit corresponds to at least one pixel unit.

The display device provided by the embodiments of the present disclosure is any product or component with a display function such as a mobile phone, a tablet computer, a television, a monitor, a notebook computer, a digital photo frame, and a navigator. Other essential components of the display device should be understood by those of ordinary skill in the art, and will not be repeated here, nor should they be used as limitations on the present disclosure. For the implementation of the display device, reference may be made to the above-mentioned embodiments of the display panel, and repeated descriptions will not be repeated.

To sum up, in the liquid crystal lens component and its driving method and display device provided by the embodiments of the present disclosure, in two image frames that are adjacent to each other, driving signals with opposite polarities are applied to the first electrodes in one liquid crystal lens unit, so that the liquid crystal polarization phenomenon can be avoided. In addition, in one image frame, positive voltage driving signals are applied to partial first sub-electrodes of all the first sub-electrodes in the liquid crystal lens component, and negative voltage driving signals are applied to the remaining first sub-electrodes of all the first sub-electrodes in the liquid crystal lens component. Since the polarity of interference signal caused by the positive pressure signal on the common voltage signal and the polarity of interference signal caused by the negative voltage signal on the common voltage signal are opposite, the recovery time of the driving signal for the second electrode is relatively short, which results the superimposition effect that approximately non-interference, thereby avoiding changes in the morphology of the liquid crystal lens, and avoiding affecting the display effect when the liquid crystal lens component is applied to display products.

While preferred embodiments of the invention have been described, additional changes and modifications to these embodiments can be made by those skilled in the art once the basic inventive concept is appreciated. Therefore, it is intended that the appended claims be construed to cover the preferred embodiment as well as all changes and modifications which fall within the scope of the invention.

Apparently, those skilled in the art can make various changes and modifications to the embodiments of the present invention without departing from the spirit and scope of the embodiments of the present invention. In this way, if the modifications and variations of the embodiments of the present invention fall within the scope of the claims of the present invention and equivalent technologies, the present invention also intends to include these modifications and variations.

What is claimed is:

1. A method for driving a liquid crystal lens component, wherein the liquid crystal lens component comprises:
   a plurality of liquid crystal lens units arranged in an array;
   each of the plurality of liquid crystal lens units comprises:
      a first electrode and a second electrode disposed oppositely, and a liquid crystal layer between the first electrode and the second electrode;
      the first electrode comprises: a plurality of first sub-electrodes arranged along a first direction and extending along a second direction, wherein the first direction intersects the second direction;
      the plurality of first sub-electrodes are divided into: a first electrode group and a second electrode group respectively on both sides of a center of the liquid crystal lens unit;
   wherein the method comprises:
   applying a common voltage signal to the second electrode, and applying a driving signal to the first electrode to control liquid crystals in the liquid crystal layer to be deflected to form a liquid crystal lens; wherein
   wherein the applying the driving signal to the first electrode, comprises:
   in two image frames that are adjacent to each other, applying driving signals with opposite polarities to the first electrode in one liquid crystal lens unit;
   in one image frame, applying driving signals with the same polarity to the plurality of first sub-electrodes in a same first electrode group, applying driving signals with the same polarity to the plurality of first sub-electrodes in a same second electrode group, applying positive voltage driving signals to partial first sub-electrodes of all first sub-electrodes in the liquid crystal lens component, and applying negative voltage driving signal to the remaining first sub-electrodes of all the first sub-electrodes in the liquid crystal lens component.

2. The method according to claim 1, wherein the applying the driving signal to the first electrode, further comprises:
   in one image frame, applying driving signals with opposite polarities to the first electrode group and the second electrode group in each of the plurality of liquid crystal lens units.

3. The method according to claim 2, wherein in the first direction, two liquid crystal lens units that are adjacent to each other share first sub-electrodes at a position at which the two liquid crystal lens units are adjacent; and the applying the driving signal to the first electrode further comprises:
   in one image frame and in the first direction, applying driving signals with the same polarity to a first electrode group and a second electrode group that are in different liquid crystal lens units and adjacent to each other.

4. The method according to claim 3, wherein the plurality of liquid crystal lens units are divided into a plurality of liquid crystal lens unit columns extending along the second direction and arranged along the first direction; and the applying the driving signal to the first electrode further comprises:
   in one image frame, applying driving signals with the same polarity to first electrode groups in a same liquid crystal lens unit column, and applying driving signals with the same polarity to second electrode groups in a same liquid crystal lens unit column.

5. The method according to claim 2, wherein first electrodes in the plurality of liquid crystal lens units are independent of each other, and the plurality of liquid crystal lens units are divided into a plurality of liquid crystal lens unit columns extending along the second direction and arranged along the first direction; and the applying the driving signal to the first electrode further comprises:
   in one image frame, applying driving signals with opposite polarities to first electrode groups that are adjacent to each other in a same liquid crystal lens unit column; and applying driving signals with opposite polarities to second electrode groups that are adjacent to each other in a same liquid crystal lens unit column.

6. The method according to claim 2, wherein first electrodes in the plurality of liquid crystal lens units are independent of each other, and the plurality of liquid crystal lens units are divided into a plurality of liquid crystal lens unit columns extending along the second direction and arranged along the first direction; the plurality of liquid crystal lens units are further divided into a plurality of liquid crystal lens unit groups arranged along the second direction, and each of the plurality of liquid crystal lens unit groups comprises a plurality of liquid crystal lens unit rows extending along the first direction; and the applying the driving signal to the first electrode further comprises:
   in one image frame, applying driving signals with the same polarity to first electrode groups in a same liquid crystal lens unit group in one liquid crystal lens unit column, applying driving signals with the same polarity to second electrode groups in a same liquid crystal lens unit group in one liquid crystal lens unit column; applying driving signals with the opposite polarities to first electrode groups in liquid crystal lens unit groups that are adjacent to each other in one liquid crystal lens unit column, and applying driving signals with the opposite polarities to second electrode groups in liquid crystal lens unit groups that are adjacent to each other in one liquid crystal lens unit column.

7. The method according to claim 1, wherein first electrodes in the plurality of liquid crystal lens units are independent of each other, and the plurality of liquid crystal lens units are divided into a plurality of liquid crystal lens unit rows extending along the first direction and arranged along the second direction; and the applying the driving signal to the first electrode further comprises:
in one image frame, applying driving signals with the same polarity to first sub-electrodes in a same liquid crystal lens unit row, and applying driving signals with opposite polarities to first sub-electrodes in liquid crystal lens unit rows that are adjacent to each other.

8. The method according to claim 1, wherein first electrodes in the plurality of liquid crystal lens units are independent of each other, and the plurality of liquid crystal lens units are divided into a plurality of liquid crystal lens unit groups arranged along the second direction, and each of the plurality of liquid crystal lens unit groups comprises a plurality of liquid crystal lens unit rows extending along the first direction; and
wherein the applying the driving signal to the first electrode further comprises:
in one image frame, applying driving signals with the same polarity to first sub-electrodes in a same liquid crystal lens unit group, and applying driving signal with opposite polarities to first sub-electrodes in two liquid crystal lens unit groups that are adjacent to each other.

9. The method according to claim 1, wherein first electrodes in the plurality of liquid crystal lens units are independent of each other, and the applying the driving signal to the first electrode further comprises:
in one image frame, applying driving signals with the same polarity to first sub-electrodes in a same liquid crystal lens unit, and applying driving signals with opposite polarities to first sub-electrodes in liquid crystal lens units that are adjacent to each other.

10. The method according to claim 1, wherein the first electrode further comprises: a third electrode group between the first electrode group and the second electrode group; and the applying the driving signal to the first electrode further comprises:
applying the common voltage signal to the third electrode group.

11. The method according to claim 10, wherein the third electrode group comprises at least one second sub-electrode extending along the second direction; an orthographic projection of the center of the liquid crystal lens unit on the liquid crystal layer is located in an orthographic projection of one of the at least one second sub-electrode in the third electrode group on the liquid crystal layer; and the applying the common voltage signal to the third electrode group comprises:
applying the common voltage signal to the at least one second sub-electrode.

12. The method according to claim 1, wherein the common voltage signal is a zero voltage signal.

13. The method according to claim 1, wherein the first electrode group and the second electrode group comprise a same quantity of first sub-electrodes; from the center of the liquid crystal lens unit to two edges of the liquid crystal lens unit, absolute values of driving voltages applied to the first sub-electrodes are distributed with a preset gradient.

14. A liquid crystal lens component, comprising:
a plurality of liquid crystal lens units arranged in an array;
wherein each of the plurality of liquid crystal lens units comprises: a first electrode and a second electrode disposed oppositely, a liquid crystal layer between the first electrode and the second electrode;
the first electrode comprises: a plurality of first sub-electrodes arranged along a first direction and extending along a second direction, wherein the first direction intersects the second direction; and
the plurality of first sub-electrodes are divided into: a first electrode group and a second electrode group respectively on both sides of a center of the liquid crystal lens unit;
wherein the liquid crystal lens component is driven by the method according to claim 1.

15. A display device, comprising: a display panel, and the liquid crystal lens component according to claim 14 on a display side of the display panel.

16. The liquid crystal lens component according to claim 14, wherein the liquid crystal lens component is driven by:
in one image frame, applying driving signals with opposite polarities to the first electrode group and the second electrode group in each of the plurality of liquid crystal lens units.

17. The liquid crystal lens component according to claim 16, wherein in the first direction, two liquid crystal lens units that are adjacent to each other share first sub-electrodes at a position at which the two liquid crystal lens units are adjacent; and the liquid crystal lens component is driven by:
in one image frame and in the first direction, applying driving signals with the same polarity to a first electrode group and a second electrode group that are in different liquid crystal lens units and adjacent to each other.

18. The liquid crystal lens component according to claim 17, wherein the plurality of liquid crystal lens units are divided into a plurality of liquid crystal lens unit columns extending along the second direction and arranged along the first direction; and the liquid crystal lens component is driven by:
in one image frame, applying driving signals with the same polarity to first electrode groups in a same liquid crystal lens unit column, and applying driving signals with the same polarity to second electrode groups in a same liquid crystal lens unit column.

19. The liquid crystal lens component according to claim 16, wherein first electrodes in the plurality of liquid crystal lens units are independent of each other, and the plurality of liquid crystal lens units are divided into a plurality of liquid crystal lens unit columns extending along the second direction and arranged along the first direction; and the liquid crystal lens component is driven by:
in one image frame, applying driving signals with opposite polarities to first electrode groups that are adjacent to each other in a same liquid crystal lens unit column; and applying driving signals with opposite polarities to second electrode groups that are adjacent to each other in a same liquid crystal lens unit column.

20. The liquid crystal lens component according to claim 16, wherein first electrodes in the plurality of liquid crystal lens units are independent of each other, and the plurality of liquid crystal lens units are divided into a plurality of liquid crystal lens unit columns extending along the second direction and arranged along the first direction; the plurality of liquid crystal lens units are further divided into a plurality of liquid crystal lens unit groups arranged along the second direction, and each of the plurality of liquid crystal lens unit groups comprises a plurality of liquid crystal lens unit rows extending along the first direction; and the liquid crystal lens component is driven by:

in one image frame, applying driving signals with the same polarity to first electrode groups in a same liquid crystal lens unit group in one liquid crystal lens unit column, applying driving signals with the same polarity to second electrode groups in a same liquid crystal lens unit group in one liquid crystal lens unit column; applying driving signals with the opposite polarities to first electrode groups in liquid crystal lens unit groups that are adjacent to each other in one liquid crystal lens unit column, and applying driving signals with the opposite polarities to second electrode groups in liquid crystal lens unit groups that are adjacent to each other in one liquid crystal lens unit column.

\* \* \* \* \*